(12) United States Patent
Kunimoto et al.

(10) Patent No.: US 7,160,643 B2
(45) Date of Patent: Jan. 9, 2007

(54) BATTERY PACK

(75) Inventors: Kiyoshi Kunimoto, Himeji (JP);
Shoichi Toya, Kasai (JP); Saburo Kouno, Kasai (JP); Yutaka Ueki, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 639 days.

(21) Appl. No.: 10/351,498

(22) Filed: Jan. 27, 2003

(65) Prior Publication Data

US 2003/0143459 A1    Jul. 31, 2003

(30) Foreign Application Priority Data

Jan. 28, 2002 (JP) ............. 2002-017899
Jan. 29, 2002 (JP) ............. 2002-020604
Jan. 30, 2002 (JP) ............. 2002-022508
Jan. 31, 2002 (JP) ............. 2002-023227
Jan. 31, 2002 (JP) ............. 2002-023228

(51) Int. Cl.
*H01M 2/10* (2006.01)
*H01M 6/42* (2006.01)
*H01M 2/42* (2006.01)

(52) U.S. Cl. ............. 429/97; 429/99; 429/100; 429/157; 429/158; 429/159; 429/160; 429/161

(58) Field of Classification Search ............. 429/97, 429/99, 100, 148, 149, 156, 157, 158, 159, 429/160, 161
See application file for complete search history.

(56) References Cited

U.S. PATENT DOCUMENTS 5,976,729 A   11/1999   Morishita et al.
6,340,877 B1 *  1/2002  Mita et al. ............. 320/112
6,599,660 B1   7/2003   Oda et al.

2004/0053126 A1   3/2004   Hirano et al.

FOREIGN PATENT DOCUMENTS

| CN | 1166062 | 11/1997 |
|---|---|---|
| CN | 1315748 | 10/2001 |
| CN | 1513216 | 7/2004 |
| EP | 0 798 794 | 10/1997 |
| EP | 1 120 841 | 8/2001 |
| EP | 1 139 462 | 10/2001 |
| JP | 54-52640 | 4/1979 |
| JP | 4-136866 | 12/1992 |
| JP | 10-106533 | 4/1998 |
| JP | 11-297300 | 10/1999 |
| JP | 2000-58025 | 2/2000 |

(Continued)

*Primary Examiner*—Bruce F. Bell
(74) *Attorney, Agent, or Firm*—Wenderoth, Lind & Ponack, L.L.P.

(57) ABSTRACT

A battery pack includes a plurality of batteries interlocked linearly through a connector. The connector includes an inner peripheral portion to be welded to one battery, and an outer peripheral portion, provided outside the inner peripheral portion, to be welded to the other battery. The inner peripheral portion and the outer peripheral portion have a step in between, and the step places the inner peripheral portion in a concave portion of the connector. The inner peripheral portion of the connector is located interiorly of a caulking convex strip provided at an end face of one battery, and an inner peripheral portion is connected to the battery end face through welding without coming in contact with the caulking convex strip. The outer peripheral portion is connected to an outer peripheral portion of a battery end face of the other battery through welding.

22 Claims, 8 Drawing Sheets

FOREIGN PATENT DOCUMENTS

| | | |
|---|---|---|
| JP | 2000-100416 | 4/2000 |
| JP | 2000-106170 | 4/2000 |
| JP | 2000-138051 | 5/2000 |
| JP | 2000-357502 | 12/2000 |
| JP | 2001-126703 | 5/2001 |
| JP | 2001-345086 | 12/2001 |
| JP | 2001-345088 | 12/2001 |
| JP | 2001-345091 | 12/2001 |
| JP | WO 02/49129 A2 * | 6/2002 |
| WO | 02/49129 | 6/2002 |

* cited by examiner

BATTERY PACK

This application is based on applications No. 17899 filed on Jan. 28, 2002, No. 20604 filed on Jan. 29, 2002, No. 22508 filed on Jan. 30, 2002, No. 23227 filed on Jan. 31, 2002 and No. 23228 filed on Jan. 31, 2002 in Japan, the content of which incorporated hereinto by reference.

BACKGROUND OF THE INVENTION

The present invention relates to a battery pack composed of a plurality of linearly interlocked batteries.

A battery pack composed of linearly interlocked secondary batteries is chiefly used in a motor vehicle, such as a hybrid car. For the battery pack of this structure, it is important to interlock the secondary batteries securely in a low resistance state. Large connection resistance not only reduces an output from the battery pack, but also gives rise to heat generation through Joule heating; moreover, losses due to resistance make the power utilization less efficient. JP-A-10-106533 discloses a structure using a connector for a battery pack composed of linearly interlocked secondary batteries. FIG. 1 and FIG. 2 respectively show the battery pack and the connector of this publication. This battery pack uses a metal cap as a connector 190. As shown in FIG. 2, the metal cap is formed by pressing a metal plate into a shape such that a cylindrical portion 194 is coupled to the outer periphery of a flat portion 193. As shown in the cross section of FIG. 1, two secondary batteries 110 are interlocked linearly with the metal cap by jointing the flat portion 193 to a sealing plate 112 of one secondary battery 110 through spot welding, and by jointing the cylindrical portion 194 to the circumferential surface of a cylindrical exterior case 111 of the other secondary battery 110 through spot welding.

The battery pack shown in FIG. 1 needs to joint the metal cap to the secondary batteries 110 through spot welding in two steps. This is because the flat portion 193 is jointed to the sealing plate 112 of one secondary battery 110 through spot welding in one step, and the cylindrical portion 194 is jointed to the exterior case 111 of the other secondary battery 110 through spot welding in the following step. For this reason, this battery pack has a drawback in that the connecting process of the metal cap cannot be any simpler. Further, this battery pack has another drawback in that the metal cap of this structure has a distance from the spot welding positions on the flat portion 193 to those on the cylindrical portion 194, and electric resistance between the spot-welded portions on the two secondary batteries 110 is increased because of the distance.

With the aim of eliminating these drawbacks, the Applicant of the present application. developed a connector 390 in the shape as shown in FIG. 3 (Japanese Patent Application No. 2000-273647). The connector 390 is provided with welding convex portions 392 protruding from both surfaces for welding purposes. As shown in the cross section of FIG. 4, the welding convex portions 392 are connected respectively to the opposing battery end faces of linearly aligned secondary batteries 310 by welding. The connector 390 is welded to the battery end faces by flowing a welding current through the secondary batteries 310 while the connector is pinched between the secondary batteries 310. The battery pack of this structure allows the connector 390 to be welded to the opposing battery end faces of the secondary batteries 310 in a single step. This battery pack, however, has a drawback in that it is difficult to interlock adjacent secondary batteries 310 through the connector 390 securely in a robust structure. In other words, the drawback of the battery pack adopting the connector 390 to enable the interlock is that the bending strength at the connection portions is poor.

The present invention was developed with the aim of eliminating these drawbacks. An important object of the invention is therefore to provide a battery pack in which batteries can be interlocked securely in a reliable manner by welding in a simple and easy way while being electrically connected in a low resistance state.

SUMMARY OF INVENTION

A battery pack of the present invention includes a plurality of linearly interlocked batteries. The battery pack is provided with a connector, disposed between the batteries to be interlocked, for electrically connecting the batteries, and the connector is welded to the batteries to electrically connect the batteries. The connector includes an inner peripheral portion to be welded to one battery, and an outer peripheral portion, provided outside the inner peripheral portion, to be welded to the other battery. The inner peripheral portion and the outer peripheral portion have a step in between, and the step places the inner peripheral portion in a concave portion of the connector. The inner peripheral portion of the connector is present inside a caulking convex strip provided on an end face of one battery, and connected to the battery end face by welding without coming in contact with the caulking convex strip. The outer peripheral portion of the connector is connected to an outer peripheral portion of a battery end face of the other battery by welding.

The connector may be provided with welding convex portions to be welded to the batteries on the inner peripheral portion and on the outer peripheral portion in such a manner that the welding convex portion on the inner peripheral portion and the welding convex portion on the outer peripheral portion are located in close proximity to each other. Further, the connector may be provided with a plurality of welding convex portions on one of the inner peripheral portion and the outer peripheral portion, so that notch portions are made between the adjacent welding convex portions. Furthermore, the battery pack may be provided with an insulator disposed between the outer peripheral portion of the connector and the caulking convex strip. This battery pack makes it possible to forestall shorting in a reliable manner by preventing the connector from coming in contact with the caulking convex strip.

Moreover, the battery pack may be provided with a connector and a holder cap for an insulator both disposed between the batteries to be interlocked linearly. This battery pack permits the batteries to be interlocked efficiently while the connector and the insulator are held by the holder cap.

The battery pack of the above-described structures has the advantage that the batteries can be interlocked securely in a reliable manner through welding in a simple and easy way while being electrically connected in a low resistance state. This is because the battery pack is arranged in such a manner that the connector is coupled to the batteries, not by welding the points on the same circumference of the connector to the opposing battery end face, but by welding the inner peripheral portion and the outer peripheral portion of the connector to separate battery end faces, respectively. In particular, the outer shape of the connector can be increased by electrically isolating the connector from the caulking convex strip with the insulator. The battery pack, in which batteries are interlocked through a large connector at more than one point through welding, has good strength at the connection portions, and in particular, attains sufficient strength to resist bending stress, which makes it possible to interlock the batteries securely in a reliable manner.

Moreover, the structure of welding the inner peripheral portion and the outer peripheral portion respectively to the opposing battery end faces at more than one point allows the welding points on the inner peripheral portion and those on the outer peripheral portion to be located in close proximity. Hence, electric resistance between the connection portions can be lower than that of the conventional battery pack in which more than one point on the same circumference is welded to the opposing battery end face. This structure, together with the structure formed by welding both surfaces of the connector respectively to the opposing battery end faces, makes it possible to offer the advantage that two batteries can be connected in a low resistance state.

The above and further objects and features of the invention will more fully be apparent from the following detailed description in conjunction with the accompanying drawings.

DETAILED DESCRIPTION OF THE INVENTION

Figure 1:
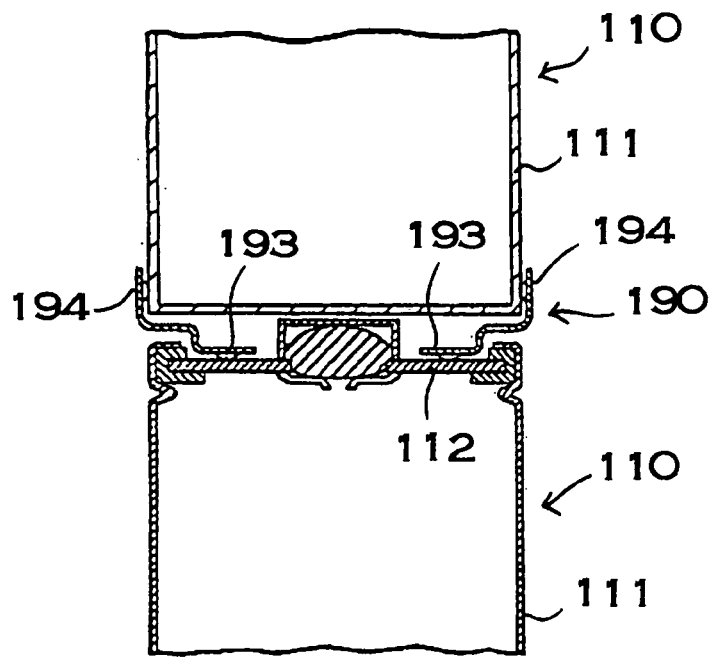
FIG. 1 is a longitudinal cross section showing an interlocking structure of a conventional battery pack.
Figure 2:
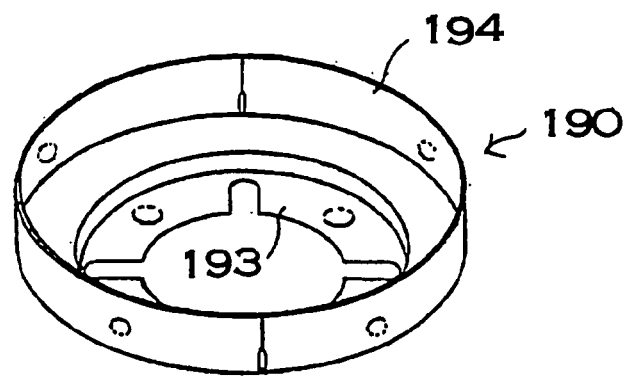
FIG. 2 is a perspective view showing a connector of the battery pack shown in FIG. 1.
Figure 3:
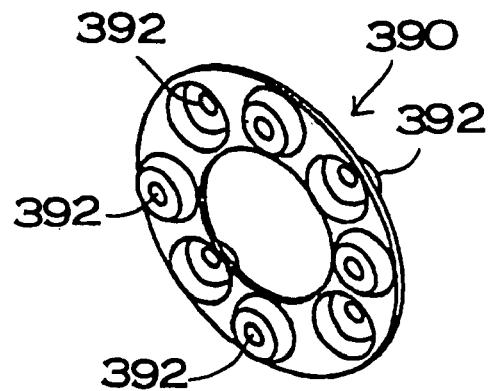
FIG. 3 is a perspective view of a connector used in a battery pack disclosed in an earlier-filed application by the Applicant of the present application.
Figure 4:
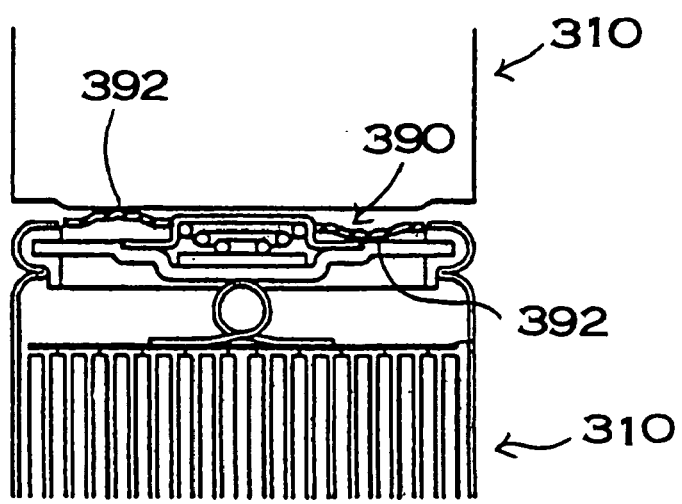
FIG. 4 is a longitudinal cross sectional view showing a coupling structure of a connector shown in FIG. 3.
Figure 5:
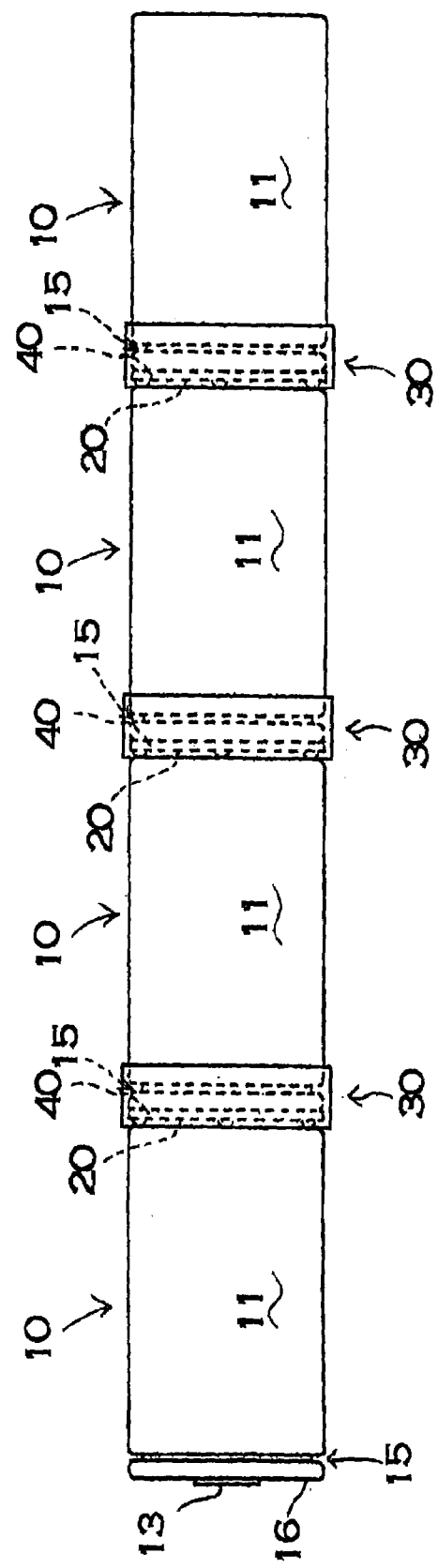
FIG. 5 is a side view of a battery pack according to one embodiment of the invention.

A battery pack shown in FIG. 5 is composed of a plurality of series-connected and linearly interlocked secondary batteries 10. More than one battery pack of this structure is connected in series and chiefly used in a motor vehicle, such as a hybrid car. It should be appreciated, however, that the battery pack of the invention can be used in an application in which a large output is needed other than a motor vehicle. The battery pack shown in FIG. 5 is composed of series-connected and linearly interlocked secondary batteries of cylindrical batteries. It should be appreciated, however, that the battery pack may be composed of series-connected and linearly interlocked secondary batteries of prismatic batteries.

Figure 6:
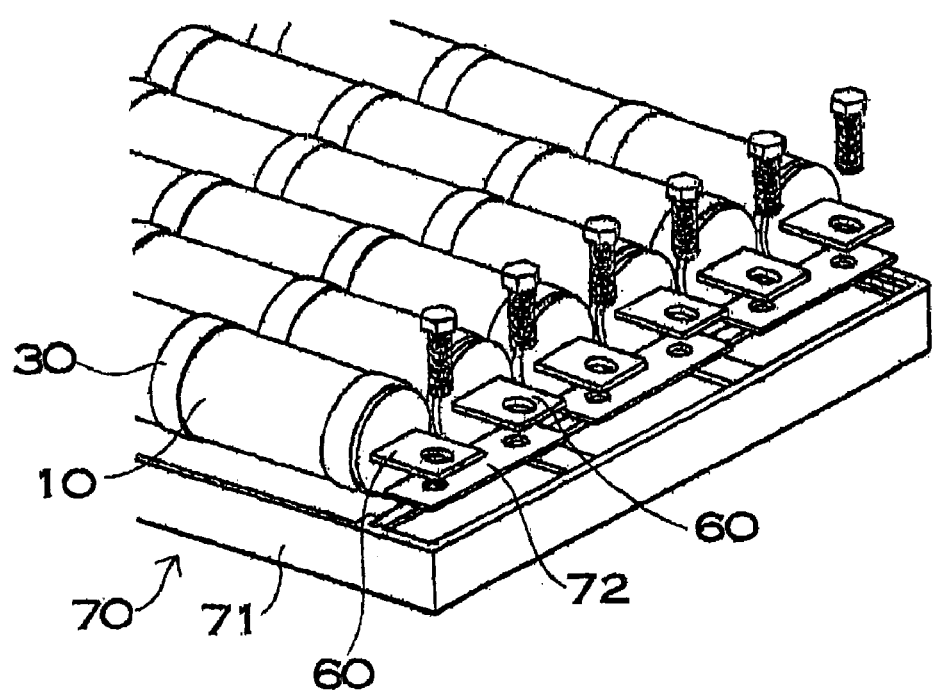
FIG. 6 is a perspective view showing a structure for accommodating the battery pack shown in FIG. 5 in a casing.

As shown in FIG. 6, the battery packs are aligned in parallel on the same flat plane and accommodated in a casing 70. The battery packs aligned crosswise are connected with one another in series and thereby raise an output voltage. Each battery pack is fixed to the casing 70 at the both ends. Each battery pack is provided with terminals 60, which are fixed to the battery end faces at the both ends so as to protrude therefrom and are coupled to the casing 70. The terminals 60 of the battery pack of the drawing are fixed perpendicularly to the battery end faces. Each terminal 60 is fastened to a bus bar 72 fit into a fixed position on a lower casing portion 71 with a screw. Each bus bar 72 not only interlocks the adjacent battery packs, but also electrically connects the battery packs in series. The bus bars 72 and the terminals 60 are pinched between the lower casing portion 71 and an upper casing portion (not shown), and are thereby fixed in their respective fixed positions.

The secondary batteries 10 can be any type of rechargeable battery, such as a nickel metal-hydride battery, a lithium ion secondary battery, and a nickel-cadmium battery. It should be noted that the nickel metal-hydride battery is suitable as the secondary batteries used for battery packs mounted on a motor vehicle because of its excellent large current characteristic that the output is large with respect to the volume and the weight.

Figure 7:
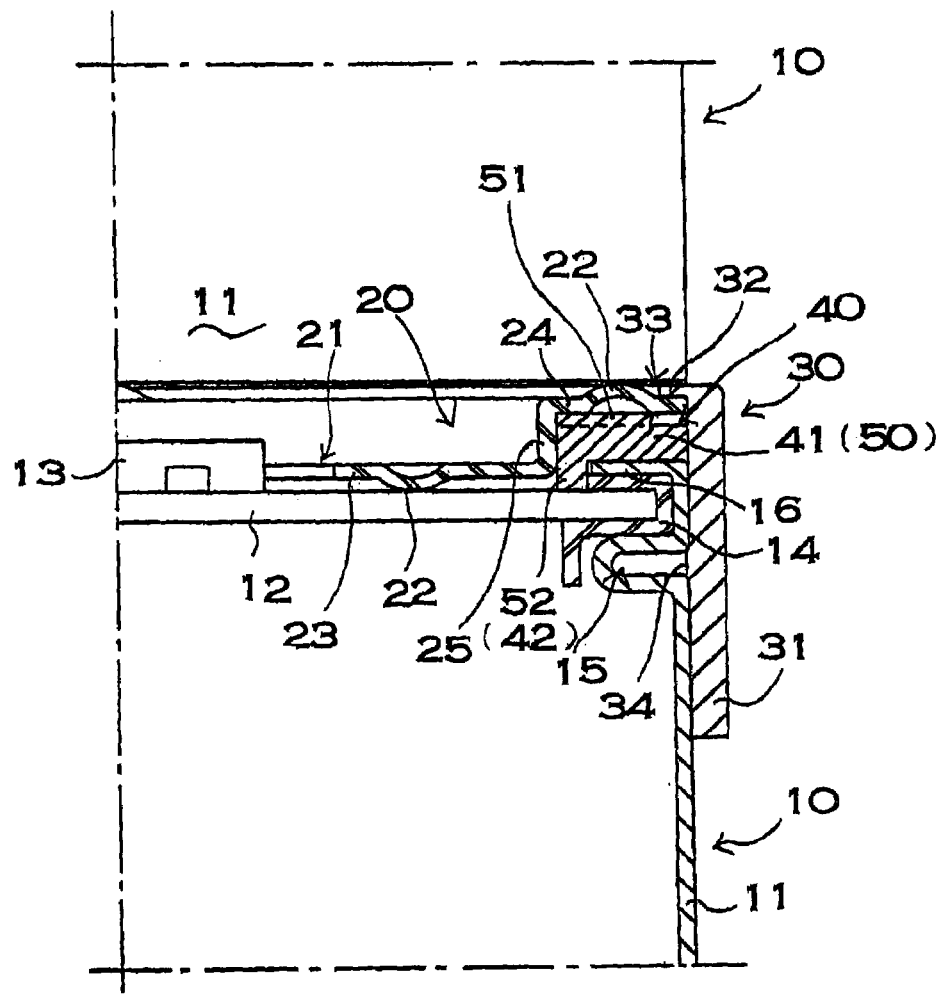
FIG. 7 is an enlarged cross sectional view showing an interlocking structure of the battery pack shown in FIG. 5.

As shown in the cross section of FIG. 7, the opening portion of an exterior case 11 of the secondary battery 10 is sealed hermetically with a sealing plate 12. Both the exterior case 11 and the sealing plate 12 are made from a metal plate. The exterior case 11 is manufactured by pressing the metal plate into the shape of a bottomed-cylinder. A convex portion electrode 13 is welded to the sealing plate 12 at the center. The exterior case 11 has an interior electrode (not shown). Further, the interior is filled with an electrolyte solution. The exterior case 11 fixes the sealing plate 12 hermetically through caulking of the end portion of the opening portion. The sealing plate 12 is fixed hermetically by being pinched in a caulking portion of the exterior case 11 through a gasket 14. The gasket 14 is a rubber-like elastic body made of an insulation material, and functions to electrically isolate the sealing plate 12 from the exterior case 11 while hermetically clogging a clearance between the sealing plate 12 and the exterior case 11. The secondary battery 10 of this structure is provided with a slot portion 15 along the circumference at the end portion where the sealing plate 12 is provided, so that the sealing plate 12 is pinched by caulking. Further, a caulking convex strip 16 is provided at the edge of the sealing plate 12. The secondary battery 10 uses the sealing plate 12 as a first electrode and the exterior case 11 as a second electrode. A nickel metal-hydride battery uses the first electrode as the positive electrode and the second electrode as the negative electrode. The secondary battery, however, may use the first electrode as the negative electrode and the second electrode as the positive electrode.

The battery pack shown in FIG. 5 through FIG. 7 is composed of a plurality of series-connected and linearly interlocked secondary batteries 10. The battery pack is provided with a connector 20 for electrically connecting the secondary batteries and a holder cap 30 for placing the connector 20 in the fixed position, both of which are disposed between the end faces of the linearly interlocked secondary batteries 10. In this battery pack, the sealing plate 12 of one secondary battery 10 is connected to the exterior case 11 of the other secondary battery 10 through the connector 20. Because the secondary battery 10 uses the sealing plate 12 as the first electrode and the exterior case 11 as the second electrode, shorting occurs when the connector 20, which is connected to the sealing plate 12, comes in contact with the caulking convex strip 16, which is part of the exterior case 11. In order to avoid such an inconvenience, the battery pack is provided with an insulator 40 that electrically isolates the connector 20 from the caulking convex strip 16.

Figure 8:
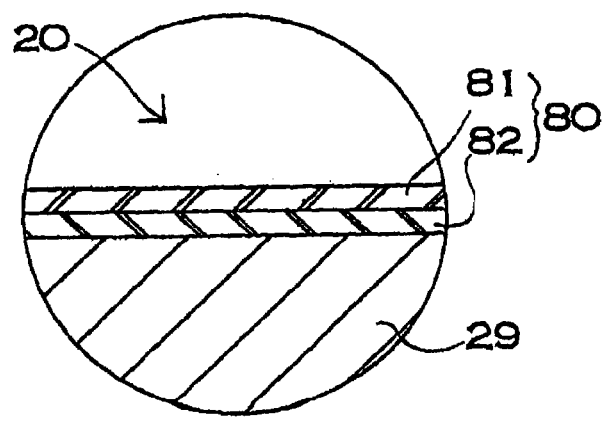
FIG. 8 is an enlarged cross sectional view of a major portion showing a metal plated layer of a connector.
Figure 9:
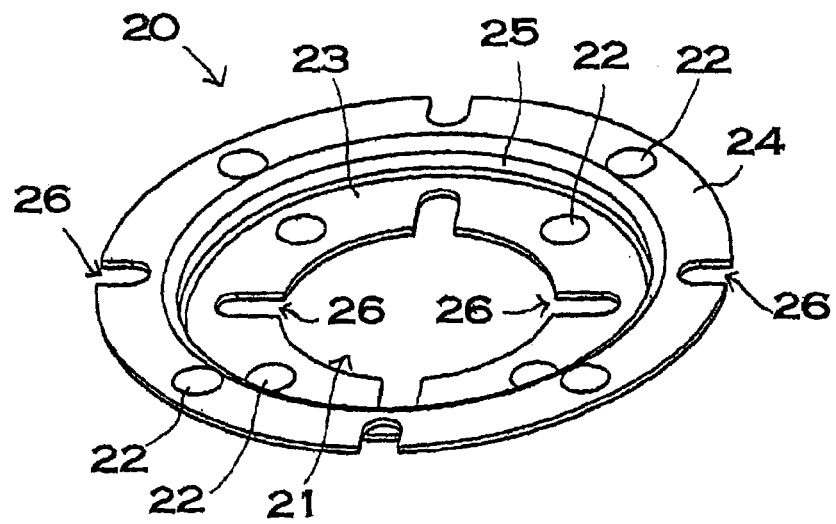
FIG. 9 is a perspective view showing the connector of the battery pack shown in FIG. 7.
Figure 10:
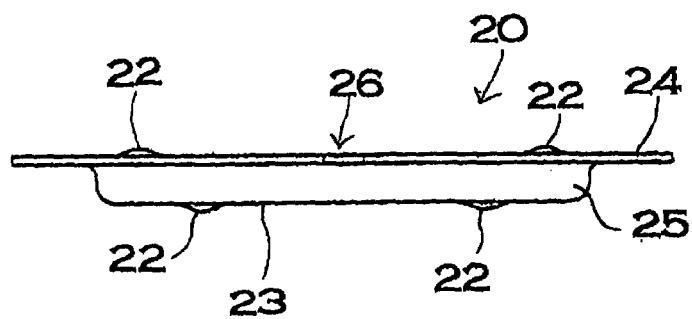
FIG. 10 is a front view of the connector shown in FIG. 9.
Figure 11:
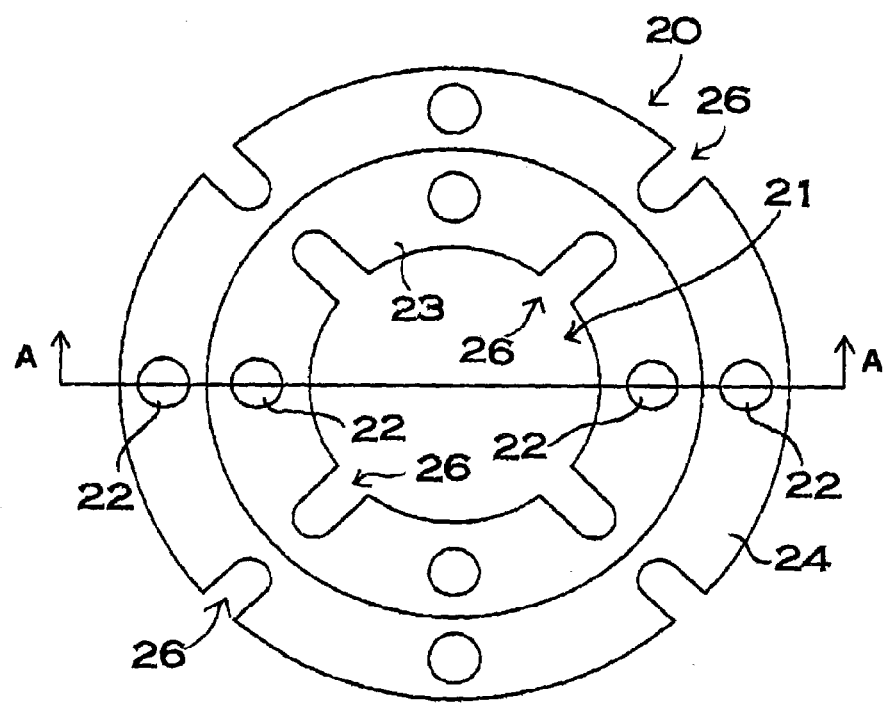
FIG. 11 is a plan view of the connector shown in FIG. 9.
Figure 12:
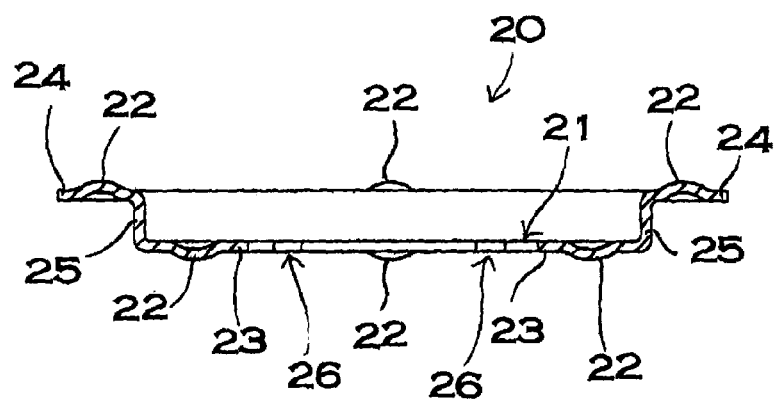
FIG. 12 is a cross sectional view of the connector taken along the line A—A of FIG. 11.

As shown in the enlarged cross section of of FIG. 8, the connector 20 shown in these drawings is manufactured by pressing a metal plate 29 having a metal plated surface into a specific shape. The metal plate 29 is a steel plate. When the metal plate 29 is a steel plate, the connector 20 made therefrom has excellent strength. It should be noted, however, that the metal plate 29 used to manufacture the connector 20 can be made of a metal having conductivity lower than that of a low resistive plated layer 82 to be described below, such as an iron plate or a nickel plate. Because the metal plate 29 having conductivity lower than that of the low resistive plated layer 82 generates larger Joule heat at the time of welding, the connector 20 can be welded to the secondary batteries 10 in a preferable state.

The connector 20 is provided with a metal plated layer 80 on each surface. The metal plated layer 80 includes a high resistive plated layer 81 and the low resistive plated layer 82 each having different conductivity. The low resistive plated layer 82 is a plated layer formed of a metal having smaller electric resistance and hence better electric conductance than the high resistive plated layer 81. The low resistive plated layer 82 is formed of a metal whose resistivity at 0° C. is, for example, $1.5 \times 10^{-8}$ to $3 \times 10^{-8}$ ($\Omega \cdot m$), preferably $1.5 \times 10^{-8}$ to $2.5 \times 10^{-8}$ ($\Omega \cdot m$), and more preferably $1.5 \times 10^{-8}$ to $2 \times 10^{-8}$ ($\Omega \cdot m$). Copper or copper alloy, or alternatively silver or silver alloy can be used as the metal of the low resistive plated layer 82. The high resistive plated layer 81 is a metal whose resistivity at 0° C. is, for example, $4 \times 10^{-8}$ to $2 \times 10^{-7}$ ($\Omega \cdot m$), preferably $4 \times 10^{-8}$ to $1.5 \times 10^{-7}$ ($\omega \cdot m$), and more preferably $4 \times 10^{-8}$ to $1 \times 10^{-7}$ ($\omega \cdot m$). The high resistive plated layer 81 is a plated layer of a metal, such as nickel or nickel alloy, chromium or chromium alloy, and titanium.

The connector 20 is preferably formed by depositing the high resistive plated layer 81 on the surface of the low resistive plated layer 82. This connector 20 has the advantage that it can generate heat effectively in the high resistive plated layer 81 and thus can be welded quickly. Also, because the high resistive plated layer 81 of nickel, chromium, etc. has a merit that it can attain excellent corrosion resistance, the connector 20 having the high resistive plated layer 81 on the surface, therefore, has can remain stable and will not deteriorate when exposed to air. It should be appreciated, however, that, the connector may be formed by depositing a low resistive plated layer on the surface of a high resistive plated layer.

The film thickness of each of the low resistive plated layer 82 and the high resistive plated layer 81 is 3 to 20 μm, preferably 3 to 10 μm, and more preferably 3 to 6 μm. Increasing the film thickness of the low resistive plated layer 82 can lower the electric resistance of the connector 20. However, when the film thickness of the low resistive plated layer 82 is increased to the extent that the electric resistance of the connector 20 becomes too low, the connector 20 cannot easily be welded to the batteries 10. Conversely, increasing the electric resistance of the low resistive plated layer 82 by reducing the film thickness thereof increases the electric resistance of the connector 20, which increases resistance between the portions connecting the secondary batteries 10. Welding becomes difficult by making the high resistive plated layer 81 either too thick or too thin, and for this reason, an optimal value is set in the above-specified range. In the case of the connector 20 having the high resistive plated layer 81 on the surface, corrosion resistance becomes poor when the high resistive plated layer 81 is too thin. With consideration given also to this inconvenience, the film thickness of the high resistive plated layer 81 is set in the above-specified range. The most preferable connector 20 is composed of a steel plate as the metal plate 29, on the surface of which a copper-plated layer having the thickness of 3 to 5 hum is provided as the low resistive plated layer 82, on the surface of which a nickel-plated layer having the thickness of 3 to 5 μm is provided as the high resistive plated layer 81.

The connector 20 having the high resistive plated layer 81 deposited on the low resistive plated layer 82 readily generates heat in the high resistive plated layer 81, and is thus welded quickly to the battery end faces. Also, because it has small electric resistance due to the low resistive plated layer 82, it can connect the secondary batteries 10 in series in a low resistance state.

The battery pack of the above-described structure has the advantage that resistance between the connection portions can be reduced while the welding is ensured. This is because the battery pack is arranged in such a manner that a metal plated layer is provided on the connector that interlocks the batteries linearly, and that the metal plated layer is a laminated structure having a high resistive plated layer deposited on a low resistive plated layer. The low resistive plated layer saves wasteful power consumption to the least possible level by lowering the resistance of the connector. The high resistive plated layer generates heat effectively at the time of welding and thereby offers an advantage that the welding is ensured. The battery pack, in which batteries are interlocked through the connectors in a low resistance state, has the advantage that not only it can reduce heat generated while the battery pack is ON by saving wasteful power consumption, but also it can increase an the battery. Incidentally, as a connector used for the battery pack of the invention, a connector having a metal plated layer was manufactured by depositing a high resistive plated layer of nickel on a low resistive plated layer of copper, and compared with a connector having a nickel-plated layer alone. The comparison reveals that the connector of the invention can lower the resistance value by 20 percent or more while achieving a coupling strength almost as good as that of the comparative connector. This means that it is possible to increase output by saving wasteful power consumption to the least possible level while the battery pack is ON.

Further, because the battery pack can achieve reliable welding and a reduction of resistance between the connection portions by using a connector on which are deposited a low resistive plated layer and a high resistive plated layer, a metal plate of various kinds can be used as the connector. This is because the influence of electric resistance of the metal plate is lessened by the high resistive plated layer and the low resistive plated layer, which allows the reliable welding and a reduction of resistance between the connection portions to be realized. Hence, the battery pack has the advantage that batteries can be interlocked securely through a connector using an extremely robust metal plate, for example, a steel plate, as the metal plate of the connector while being connected in an ideal electric characteristic.

The connector 20 is connected, through welding, to the battery end faces of adjacent secondary batteries 10 placed at opposing positions, and thereby electrically connects the secondary batteries 10 in series. FIG. 9 through FIG. 12 show the connector 20 of FIG. 7. The connector 20 shown in these drawings is formed by molding a metal plate into the shape of a toroidal ring and then providing a plurality of welding convex portions 22 protruding from the surfaces to be welded to the battery end faces. The welding convex portions 22 are welded to the first electrode and the second electrode on the opposing battery end faces, and thereby connect the adjacently placed secondary batteries 10 in series. Further, the connector 20 of FIG. 7 is provided with a central hole 21, into which the convex portion electrode 13 is provided. The connector is not necessarily provided with a central hole, and may be of a shape that guides the convex portion electrode into position.

The outer shape of the connector 20 is larger than the inner shape of the caulking convex strip 16 provided on the battery end face. The connector 20 of FIG. 7 has an outer shape that is substantially identical to the outer shape of the secondary battery 10. In order to forestall shorting by preventing the connector 20 from coming into contact with the caulking convex strip 16, an insulator 40 is disposed between the connector 20 and the caulking convex strip 16. The insulator 40 is an insulation ring 41 formed by molding an insulation material, such as a rubber-like elastic body and plastic, into the shape of a ring. The insulation ring 41 of the drawing has an outer shape that is substantially identical to the outer shape of the secondary battery 10. A ring convex strip 42 that covers the inner surface of the caulking convex strip 16 is formed integrally with the insulation ring 41 on the inner edge. The ring convex strip 42 is of a shape such that can be fit interiorly of the caulking convex strip 16 in a radial direction of the case 11. The insulation ring 41 is placed in the fixed position by fitting the ring convex strip 42 inside the caulking convex strip 16.

The battery pack of FIG. 7 uses a buffer ring 50 as the insulation ring 41.

Figure 13:
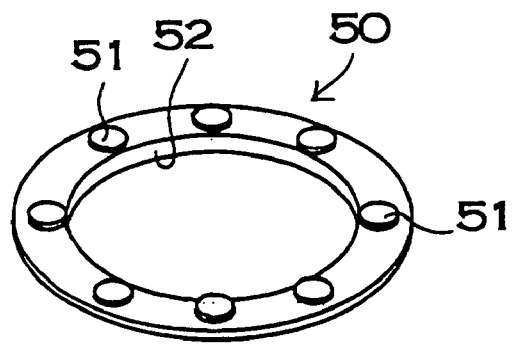
FIG. 13 is a perspective view showing a buffer ring of the battery pack shown in FIG. 7.

As shown in FIG. 13, the buffer ring 50 is formed by molding an insulation material, such as a rubber-like elastic body and elastic plastic, into the shape of a ring. In the battery pack shown in FIG. 7, the sealing plate 12 of one secondary battery 10 is connected to the exterior case 11 of the other secondary battery 10 through the connector 20. Because the secondary battery 10 uses the sealing plate 12 as the first electrode and the exterior case 11 as the second electrode, shorting occurs when the connector 20 connected to the sealing plate 12 comes into contact with the caulking convex strip 16, which is part of the exterior case 11. In order to avoid such an inconvenience, the battery pack is provided with the buffer ring 50, which is formed by molding an insulation material into the shape of a ring. The buffer ring 50 also functions as the buffer ring 41 that electrically isolates the connector 20 from the caulking convex strip 16. The buffer ring 50 of the drawing has an outer shape that is substantially identical to the outer shape of the secondary battery 10.

The buffer ring 50 shown in FIG. 13 is provided with a plurality of buffer convex portions 51, which are formed integrally with the buffer ring 50 on the surface opposing an outer peripheral surface 24 of the connector 20, which will be described below. The plurality of buffer convex portions 51 are provided at regular intervals. Because the buffer convex portions 51 come into contact with the outer peripheral portion 24 of the connector 20 at more than one point, the battery pack has the advantage that the buffering performance can be improved. Further, because the surface of the buffer ring 50 will not adhere to the outer peripheral portion 24 of the connector 20, the battery pack has another advantage that gas can smoothly pass through the clearance between the buffer ring 50 and the connector 20 using the clearance between adjacent buffering convex portions 51.

Thus, the clearance forms a degassing channel. The buffer ring 50 shown in the drawing is provided with eight buffer convex portions 51 positioned at regular intervals. It should be appreciated, however, that three to seven, or nine or greater buffer convex portions may be provided.

Further, the buffer ring 50 of FIG. 7 is provided with the ring convex strip 52 covering the inner surface of the caulking convex strip 16. The ring convex strip 52 is formed integrally with buffer ring 50 on the inner edge. The ring convex strip 52 is of a shape that can be fit inside the caulking convex strip 16. The buffer ring 50 is placed in the fixed position by fitting the ring convex strip 52 inside the caulking convex strip 16. The buffering ring 50 of FIG. 7 is also used as the insulation ring 41 that electrically isolates the connector 20 from the caulking convex strip 16. It should be appreciated, however, that the buffer ring may be a different member from the insulation ring. With this battery pack, not only can shorting be prevented by disposing the insulation ring between the caulking convex strip and the connector, but also a plurality of secondary batteries can be interlocked linearly with excellent impact resistance by disposing the buffer ring between the insulation ring and the outer peripheral portion of the connector.

The battery pack provided with the buffer ring has the advantage that a plurality of batteries can be interlocked linearly with excellent impact resistance. This is because the battery pack is arranged in such a manner that batteries are interlocked through the connector, and that the buffer ring made of an elastic body is disposed between the connector and the battery end face of one battery. Further, the connector is welded to the battery end face of one battery inside the buffer ring, while the outer peripheral portion of the connector is welded to the battery end face or the outer peripheral surface of the other battery. For example, when a bending force is applied to the battery pack of this structure, the buffer ring absorbs the bending force as part of the buffer ring between the connector and the battery end face undergoes elastic deformation so as to be squeezed. Hence, when a bending force is applied to an elongate battery pack, the buffer ring absorbs the bending force while preventing the battery pack from bending by exerting a force to resist the bending. Further, the buffer ring made of an elastic body does not induce any unreasonable force even when it undergoes elastic deformation, and therefore, the battery pack has the advantage that the bending force applied to the battery pack can be absorbed in a preferable state. This advantage can enhance the reliability in the process of fabricating an elongate battery pack. Moreover, the battery pack has the advantage that it can eliminate trouble caused when the battery pack is replaced or accommodated in the casing while being bent slightly.

The connector 20 is formed by pressing a metal plate into a shape having a step between an inner peripheral portion 23 and the outer peripheral portion 24. The inner peripheral portion 23 is located in close proximity to the surface of the sealing plate 12, and the outer peripheral portion 24 is located in close proximity to the bottom surface of the exterior case 11 on the surface of the insulation ring 41. The connector 20 is provided with a plurality of welding convex portions 22 to be used for welding on each of the inner peripheral portion 23 and the outer peripheral portion 24. The welding convex portions 22 on the inner peripheral portion 23 protrude toward the sealing plate 12 and are welded to the sealing plate 12. The welding convex portions 22 on the outer peripheral portion 24 protrude toward the bottom surface of the exterior case 11 and are welded to the outer peripheral portion of the bottom surface of the exterior case 11. The welding convex portions 22 on the inner peripheral portion 23 and those on the outer peripheral portion 24 are welded to the opposing secondary batteries 10, respectively, and the secondary batteries 10 are thereby connected in series.

The connector 20 shown in FIG. 9 through FIG. 12 is provided with four welding convex portions 22 on each of the inner peripheral portion 23 and the outer peripheral portion 24. The four welding convex portions 22 on each of the inner peripheral portion 23 and the outer peripheral portion 24 are provided concentrically. The welding convex portions 22 are provided at regular intervals at a pitch of 90° on each of the inner peripheral portion 23 and the outer peripheral portion 24. Further, the welding convex portions 22 on the inner peripheral portion 23 and the corresponding welding convex portion 22 on the outer peripheral portion 24 are located in close proximity to each other. In the connector 20 shown in the drawings, the welding convex portions 22 on the inner peripheral portion 23 and the corresponding welding convex portions 22 on the outer peripheral portion 24 are provided on the same radius in the closest proximity. The structure in which the welding convex portions 22 on the inner peripheral portion 23 and the welding convex portions 22 on the outer peripheral portion 24 are located in close proximity as described above has the advantage that a current-carrying path can be the shortest possible distance, and the electric resistance across the path can be lowered. It should be appreciated, however, that three to ten welding convex portions may be provided on each of the inner peripheral portion and the outer peripheral portion.

Further, each of the inner peripheral portion 23 and the outer peripheral portion 24 is provided with a notch portion 26 between each pair of the adjacent welding convex portions 22. The notch portions 26 in the inner peripheral portion 23 are provided so as to extend along the radius from the central hole 21 of the inner peripheral portion 23. The notch portions 26 in the outer peripheral portion 24 are provided so as to extend from the outer edge toward the center. The notch portions 26 are provided at regular intervals at a pitch of 90° in each of the inner peripheral portion 23 and the outer peripheral portion 24. The notch portions 26 in the inner peripheral portion 23 and the notch portions 26 on the outer peripheral portion 24 opposing each other are provided on the same radius so that the bottom portions come close to each other. The notch portions 26 shown in the drawings are formed in the shape of slits having the same width. It should be appreciated, however, that the notch portions are not necessarily formed in the slit-like shape, and can be of a rectangular shape or a circular shape. The connector 20 having the notch portions 26 between the adjacent welding convex portions 22 as described above has the advantage that the welding can be ensured by allowing an even welding current to flow through the respective welding convex portions 22.

Further, by dividing each of the inner peripheral portion 23 and the outer peripheral portion 24 into a plurality of regions using the notch portions 26, the connector 20 becomes able to change the orientations of the adjacent regions relatively with each other. In other words, the inner peripheral portion 23 and the outer peripheral portion 24 are of a structure that can undergo elastic deformation slightly using the notch portions 26 as the boundaries. The connector 20 of this structure disperses stress applied on the connection portions of the battery pack due to the elasticity of the divided inner peripheral portion 23 and outer peripheral portion 24, and is thus able to reduce damage to the welded portions to the least possible level. Hence, the battery pack has the advantage that the strength with respect to vibration and bending at the connection portions can be enhanced. The connector 20 of the drawings is provided with the notch portions 26 in both the inner peripheral portion 23 and the outer peripheral portion 24 so as to divide both the inner peripheral portion 23 and the outer peripheral portion 24 into a plurality of regions. It should be appreciated, however, that the notch portions may be provided in one of the inner peripheral portion and the outer peripheral portion alone, so that one of these portions whichever is provided with the notch portions is divided into a plurality of regions. Further, in the connector 20 shown in the drawings, each of the inner peripheral portion 23 and the outer peripheral portion 24 is divided into four regions using the notch portions 26. It should be appreciated, however, that the inner peripheral portion or the outer peripheral portion or the both maybe divided into three to ten regions using the notch portions.

The holder cap 30 is formed entirely by molding an insulation material, such as plastic, into a specific shape. The holder cap 30 is disposed between adjacent secondary batteries 10, and holds the connector 20 in the fixed position so as not to come off easily. The holder cap 30 is provided with a through-hole 33 used to weld both surfaces of the connector 20 to the respective opposing battery end faces. The holder cap 30 of FIG. 7 includes a holder portion 32 that holds the connector 20 at the fixed position, and a cylinder potion 31 molded into a shape such that can be coupled to the outer periphery of the holder portion 32. The cylinder portion 31 and the holder portion 32, which together form the entire plastic holder cap 30, can be molded integrally, which eliminates the need to manufacture the holder portion 32 and the cylinder portion 31 separately and then put them together. The through-hole 33 is made in the holder portion 32. Into the cylinder portion 31 is inserted the end portion of the secondary battery 10 having the slot portion 15 on the circumference. Further, the cylinder portion 31 is provided with a stopper convex portion 34 protruding from the inner surface to be inserted into the secondary battery 10 so as not to come off easily. The stopper convex portion 34 is fit into the slot portion 15 formed at the end portion of the secondary battery 10, so that the holder cap 30 will not come off easily from the secondary battery 10. The holder cap 30 shown in the drawing is provided with a convex strip along the inner surface of the cylinder portion 31, which is used as the stopper convex portion 34. It should be appreciated, however, that the stopper convex portion 34 is not necessarily formed in the shape of a convex strip. The stopper convex portion can be of a shape such that partially protruding convex portions are provided at positions opposing the slot portion of the secondary battery.

If the stopper convex portion 34 protruding from the inner surface is too high, the end portion of the secondary battery 10 is not inserted into the cylinder portion 31 smoothly. Conversely, if the stopper convex portion 34 is too low, the inserted secondary battery 10 readily comes off. Thus, the height of the stopper convex portion 34 is designed in such a manner that the secondary battery 10 can be inserted smoothly but will not come off easily. The holder cap may be provided with longitudinal slits in the cylinder portion. When arranged in this manner, the end portion of the secondary battery can be inserted smoothly into the cylinder portion even when a high stopper convex portion is provided. This is because the cylinder portion cut into a plurality of segments by the slits can readily undergo elastic deformation. It should be noted, however, that the secondary battery can be also inserted smoothly into the cylinder portion having no slits in such a manner that it will not come off easily by adjusting the stopper convex portion to an optimal height.

The battery pack of FIG. 7 is provided with the insulation ring 41 to electrically isolate the caulking convex strip 16. An inner edge of the insulation ring 41 is provided with the ring convex strip 42. The insulation ring 41 is disposed between the caulking convex strip 16 and the outer peripheral portion 24 of the connector 20, and thereby electrically isolates the connector 20 from the caulking convex strip 16. The insulation ring 41 has an outer shape that is substantially identical to the outer shape of the secondary battery 10, and is held at the fixed position by the holder cap 30. Further, the insulation ring 41 is also placed in the fixed position so as not to cause any displacement through the use of the caulking convex strip 16 by fitting the ring convex portion 42 inside or interiorly of the caulking convex strip 16.

The holder cap 30 of FIG. 7 is provided with the larger through-hole 33 and the narrower holder portion 32. Through the larger through-hole 33 is exposed the outer peripheral portion 24 of the connector 20 provided above the caulking convex strip 16, to the bottom surface of the exterior case 11 provided on the top in the drawing. The holder portion 32 is positioned on the top surface of the outer edge of the connector 20, and holds the connector 20 in the fixed position so as not to come off easily. The outer shape of the connector 20 is substantially identical with the outer shape of the secondary battery 10. In other words, the outer periphery of the connector is substantially identical with the inner shape of the cylinder portion 31. Hence, the connector 20 abuts on the inner surface of the cylinder portion 31, which prevents any horizontal displacement. Further, the connector 20 shown in the drawing is provided with the step between the inner peripheral portion 23 and the outer peripheral portion 24. A step portion 25 abuts on the inner peripheral surface of the insulation ring 41, which allows the connector 20 to be placed at the fixed position.

The battery pack of the above-described structure has the advantage that the batteries can be interlocked quite efficiently and safely while preventing shorting of the connector in a reliable manner. This is because the battery pack is arranged in such a manner that the connector interlocking the batteries is coupled to the batteries through welding while being held at the fixed position by the holder cap. In particular, the holder cap includes the holder portion that holds the connector at the fixed position, and the cylinder portion into which is inserted the end portion of the battery having the slot portion on the circumference. Further, the cylinder portion is provided with the stopper convex portion, which protrudes from the inner surface and is fit into the slot portion of the battery so that the holder cap will not come off easily. Hence, the cylinder portion of the holder cap can be coupled to the battery so as not to come off easily. As has been described, in this battery pack, the connector can be held at the fixed position by the holder portion of the holder cap; moreover, the holder cap can be coupled to the battery in a reliable manner. It is thus possible to interlock the batteries quite efficiently and safely while preventing shorting of the connector in a reliable manner. Furthermore, in this battery pack, because the connector is held at the fixed position of the battery by the holder cap, the batteries can be interlocked in any posture in a reliable manner regardless of the postures of the respective batteries before they are interlocked.

Figure 14:
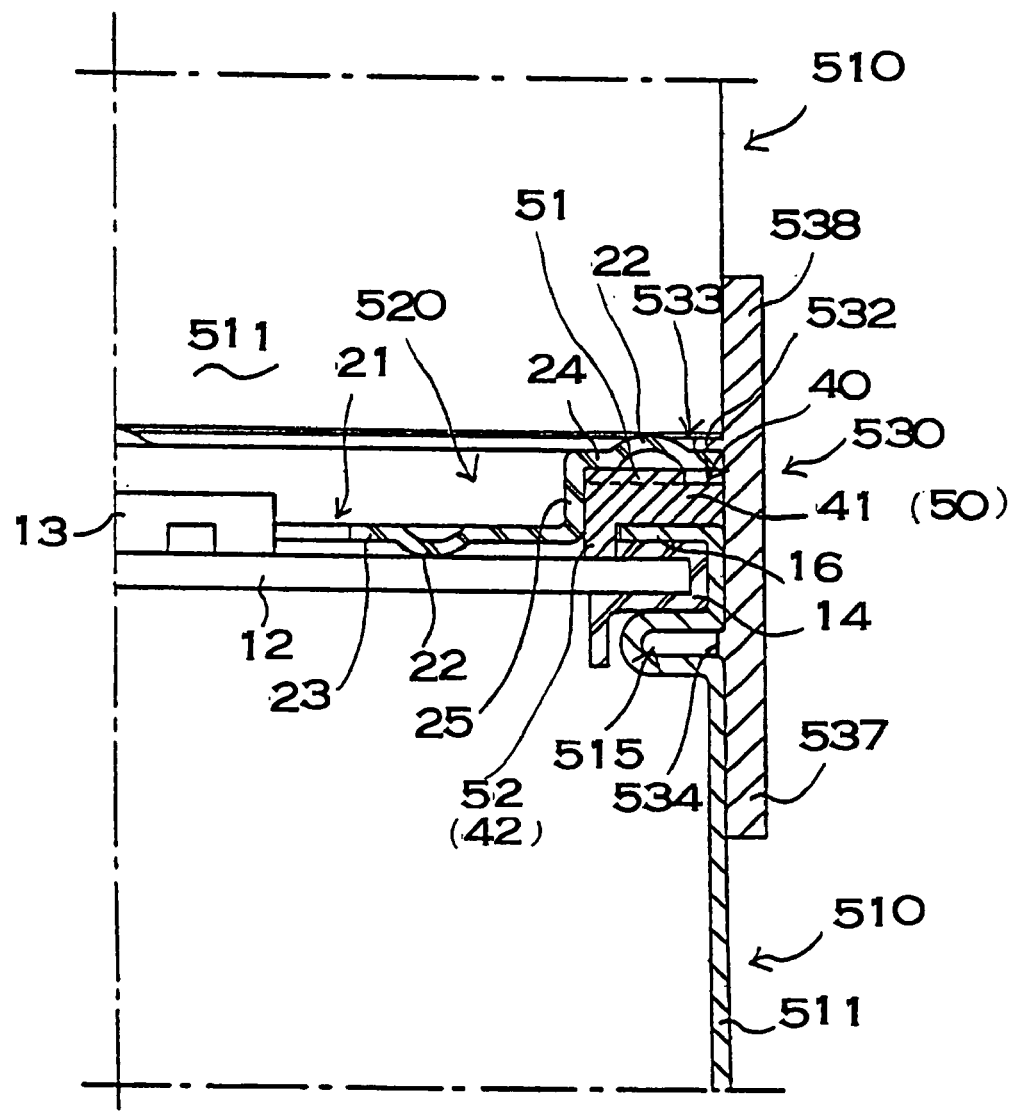
FIG. 14 is an enlarged cross sectional view showing an interlocking structure of a battery pack according to another embodiment of the invention.

Further, the holder cap may be of the structure shown in FIG. 14. In this embodiment, like components with respect to the embodiment described above are labeled with the same reference numerals. A holder cap 530 shown in FIG. 14 is formed entirely by molding an insulation material, such as plastic, into a specific shape. The holder cap 530 is disposed between adjacent secondary batteries 510, and interlocks the adjacent secondary batteries 510. In order to interlock the secondary batteries 510, the holder cap 530 includes a first cylinder portion 537 into which the end portion of one of the secondary batteries 510 to be interlocked is inserted so as to be coupled to each other, and a second cylinder portion 538 into which the end portion of the other secondary battery 510 is inserted so as to be coupled to each other. The first cylinder portion 537 and the second cylinder portion 538 are placed linearly with respect to each other. The two adjacent secondary batteries 510 are interlocked linearly with the holder cap 530 by inserting the end portions of the two adjacent secondary batteries 510 into the first cylinder portion 537 and the second cylinder portion 538, respectively.

The first cylinder portion 537 and the second cylinder portion 538 are molded into the shape of a cylinder so that the end portion of the exterior case 511 of the secondary battery 510 can be inserted without leaving any clearance. The secondary batteries, which have a cylindrical shape, are inserted into the first cylinder portion 537 and the second cylinder portion 538. The minor diameter thereof is substantially the same as the major diameter of the cylindrical battery, to be more accurate, the minor diameter thereof is made slightly smaller than the major diameter of the cylindrical battery. The slightly smaller cylindrical first cylinder portion 537 and second cylinder portion 538 expand slightly when the secondary batteries 510 are inserted, and they adhere closely to the exterior cases 511 of the secondary batteries 510 without leaving any clearance. The exterior case 511 of the secondary battery 510 has slight variance in the major diameter depending on the manufacturing process. Nevertheless, the exterior case having irregular major diameter, in particular, the secondary battery having an elongate exterior case can be inserted into the first cylinder portion 537 and the second cylinder portion 538 molded to a dimension that is slightly smaller than the specified dimension, without leaving any clearance. This is because the first cylinder portion 537 and the second cylinder portion 538 expand elastically and absorb the irregularity of the exterior case in thickness.

Into the first cylinder portion 537 is inserted the end portion of the secondary battery 510 having the slot portion 515 on the circumference. The first cylinder portion 537 is provided with a stopper convex portion 534 that protrudes from the inner surface. The stopper convex portion 534 is fit into the slot portion 515 provided on the end portion of the secondary battery 510, so that the holder cap 530 will not come off easily from the secondary battery 510. The holder cap 530 is provided with a convex strip along the inner surface of the first cylinder portion 537, which is used as the stopper convex portion 534. It should be appreciated, however, that the stopper convex portion is not necessarily formed in the shape of the convex strip. The stopper convex portion can be of a shape such that partially protruding convex portions are provided at positions opposing the slot portion of the secondary battery.

Further, the holder cap 530 of the drawing is provided with a holder portion 532 that holds the connector 520 at the fixed position so as not to come off easily. The holder portion 532 is disposed between the first cylinder portion 537 and the second cylinder portion 538, and is provided with a through-hole 533 used to weld both surfaces of the connector 520 it holds to the respective opposing battery end faces.

The first cylinder portion 537, the second cylinder portion 538, and the holder portion 532 that together form the entire plastic holder cap 530 can be molded integrally, which eliminates the need to manufacture the holder portion 532, the first cylinder portion 537, and the second cylinder portion 538 separately and then put them together. The through-hole 533 is made in the holder portion 532.

The battery pack of this structure has the advantage that a plurality of batteries can be interlocked linearly in a secure manner in a simple and easy way. This is because the battery pack is arranged in such a manner that both the connector and the holder cap are disposed between the batteries to be interlocked, and that the holder cap includes the first cylinder portion into which the end portion of one battery is inserted so as to be coupled to each other, and the second cylinder portion into which the end portion of the other battery is inserted so as to be coupled with each other, so that the adjacent two batteries are interlocked linearly with the holder cap by inserting the end portions of these batteries into the first cylinder portion and the second cylinder portion, respectively. In the battery pack of this structure, the end portions of the batteries to be interlocked are inserted into the first cylinder portion and the second cylinder portion of the holder cap, respectively, and the batteries can be thus interlocked easily in a secure manner. In particular, because the batteries are interlocked linearly by being inserted respectively into the first cylinder portion and the second cylinder portion placed linearly, the battery pack has the advantage that two batteries can be interlocked linearly in exact alignment. Further, because the battery pack of this structure holds the linearly-aligned batteries by inserting the end portions thereof into the first cylinder portion and the second cylinder portion, respectively, the bending strength of the battery pack at the interlocked portion of the batteries can be enhanced. The battery pack with enhanced bending strength can achieve excellent resistance to vibration, impact, etc., and therefore, the safety and the reliability can be enhanced by effectively preventing loose connections or the like at the connection portions.

Further, in the above-described battery pack, the connector can be coupled to the batteries efficiently while being held at the fixed position by the holder cap when necessity arises. The connector held at the fixed position by the holder cap can be coupled to the batteries at the exact positions through welding. Thus, the connector can be coupled to the batteries to be interlocked through welding efficiently at the exact positions without the need to hold the connector at the exact position.

The holder cap of FIG. 7 and FIG. 14 holds the connector 20,520 using the holder portion 32,532 so as not to come off easily. The invention, however, does not limit the structure of holding the connector at the fixed position through the use of the holder cap to the foregoing structure. The holder cap may hold the connector to the fixed position by fitting the connector into the through-hole of the holder portion in engagement so as not to come off easily. Also, when the holder cap made of plastic is molded, the connector may be inserted into the holder so as to be held at the fixed position. Further, the connector may be bonded and held at the fixed position.

Additionally, the battery pack of the invention does not have to use the holder cap to hold the connector so as not to come off easily. Although it will not be illustrated, in the battery pack of the invention, a plurality of secondary batteries can be interlocked linearly and connected in series without disposing the holder caps. In the battery pack of this structure, the connector is placed at the fixed position by allowing the step portion provided between the inner peripheral portion and the outer peripheral portion of the connector to abut on the inner peripheral surface of the buffer ring.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A battery pack comprising:
   a plurality of linearly aligned batteries; and
   a connector, disposed between two of the batteries to interlock and electrically connect the batteries, the connector being welded to the batteries to electrically connect the batteries; and
   a holder cap covering the interface between the two batteries that are interlocked linearly by the connector,
   wherein the connector includes an inner peripheral portion to be welded to one of the two batteries, an outer peripheral portion, provided outside the inner peripheral portion, to be welded to the other battery, and a step portion between the inner peripheral portion and the outer peripheral portion, the step portion placing the inner peripheral portion in a concave portion of the connector;
   wherein the inner peripheral portion of the connector is disposed on an interior side of a caulking strip that is provided on a battery end face of the one battery, and the inner peripheral portion is welded to the battery end face without coming in contact with the caulking strip, and
   wherein the outer peripheral portion of the connector is welded to an outer peripheral portion of a battery end face of the other battery such that the opposing battery end faces of the one battery and the other battery are welded with the connector, respectively, and
   wherein the holder cap includes a cylinder portion and a holder portion which is formed integrally with the cylinder portion, the holder portion protrudes inwardly such that the holder portion is inserted into a gap formed between the battery end face of the other battery and the outer peripheral portion of the connector in which the welded portion of the outer peripheral portion of the connector and the outer peripheral portion of a battery end face of the other battery is positioned.

2. The battery pack according to claim 1, wherein the connector is provided with welding convex portions on the inner peripheral portion and on the outer peripheral portion, the welding convex portions on the inner peripheral portion and the welding convex portions on the outer peripheral portion being located in close proximity to each other.

3. The battery pack according to claim 1, wherein a plurality of welding convex portions are provided on one of the inner peripheral portion and the outer peripheral portion, and notch portions are made between the welding convex portions placed adjacently.

4. The battery pack according to claim 1, further comprising an insulator disposed between the outer peripheral portion of the connector and the caulking strip.

5. The battery pack according to claim 4, wherein the insulator is an insulation ring positioned between the outer peripheral portion of the connector and the caulking strip.

6. The battery pack according to claim 1, wherein the holder portion holds the connector at a fixed position, the holder portion being provided with a through-hole used to permit connection of both surfaces of the connector respectively to the batteries placed at opposing positions.

7. The battery pack according to claim 1, wherein the holder cap includes a holder portion that holds the connector at a fixed position, and a cylinder portion, which is coupled to an outer periphery of the holder portion, and into which an end portion of the battery having a slot portion formed on a circumference thereof is inserted,
the cylinder portion being provided with a stopper portion, which protrudes from an inner surface and is fit into the slot portion which is provided at an end portion of the battery, so that the holder cap will not come off easily,
the holder cap being coupled to the battery by guiding the stopper convex portion to the slot portion of the battery, the holder cap coupled to the battery holding the connector at the fixed position.

8. The battery pack according to claim 1, wherein:
the holder cap includes a first cylinder portion into which an end portion of the one battery is inserted, and a second cylinder portion into which an end portion of the other battery is inserted so as to be coupled the two batteries to each other, the first cylinder portion and the second cylinder portion being linearly aligned with respect to each other; and thereby the two adjacent batteries are interlocked linearly with the holder cap by inserting the end portions thereof into the first cylinder portion and the second cylinder portion, respectively.

9. The battery pack according to claim 8, wherein the first cylinder portion is provided with a convex stopper portion to be guided into a slot portion provided at an end portion of the one battery.

10. The battery pack according to claim 8, wherein the holder cap includes a holder portion that holds the connector at a fixed position, the holder portion being disposed between the first cylinder portion and the second cylinder portion and provided with a through-hole for enabling connection of both surfaces of the connector respectively to the two batteries placed at opposing positions.

11. The battery pack according to claim 1, further comprising a buffer ring made of an elastic body and disposed between an outer edge of the battery end face and the connector,
wherein the connector is welded to the battery end face of the one battery inside the buffer ring and the outer peripheral portion of the connector is welded to one of the battery end face and an outer peripheral surface of the other battery.

12. The battery pack according to claim 11, wherein;
the buffer ring is an insulation ring, which is pinched between the connector and the caulking strip of an exterior case of the one battery provided so as to protrude from a circumference of the end face of the one battery and thereby electrically isolates the connector from the caulking strip of the exterior case.

13. The battery pack according to claim 12, wherein the buffer ring is provided with a ring-like strip that is provided along an inner edge of the caulking strip.

14. The battery pack according to claim 11, wherein the step portion provided between the inner peripheral portion and the outer peripheral portion of the connector is located interiorly of an inside surface of the buffer ring, the inner peripheral portion of the connector being coupled to a sealing plate of the one battery through welding, the outer peripheral portion being welded to a bottom surface of an exterior case of the other battery through welding.

15. The battery pack according to claim 11, further comprising a holder cap, disposed between the two batteries for holding the connector at a fixed position,
wherein the holder cap includes a cylinder portion into which end portions of the two batteries are inserted, and a holder portion that holds the connector.

16. The battery pack according to claim 15, wherein an outside shape of the buffer ring is substantially identical to an inner shape of the cylinder portion of the holder cap, and the buffer ring is fit into the cylinder portion.

17. The battery case according to claim 15, wherein outer shapes of the buffer ring and the connector are substantially identical with an inner shape of the cylinder portion.

18. A battery pack comprising:
a plurality of linearly aligned batteries; and
a connector, disposed between two of the batteries to interlock and electrically connect the batteries, the connector being welded to the batteries to electrically connect the batteries,
wherein the connector includes an inner peripheral portion to be welded to one of the batteries, an outer peripheral portion, provided outside the inner peripheral portion, to be welded to the other battery, and a step portion between the inner peripheral portion and the outer peripheral portion, the step portion placing the inner peripheral portion in a concave portion of the connector;
wherein the inner peripheral portion of the connector is disposed on an interior side of a caulking strip that is provided on a battery end face of the one battery, and the inner peripheral portion is welded to the battery end face without coming in contact with the caulking strip, and
wherein the outer peripheral portion of the connector is welded to an outer peripheral portion of a battery end face of the other battery such that the opposing battery end faces of the one battery and the other battery are welded with the connector, respectively,
wherein the connector comprises a metal plated layer on a surface thereof, the metal plated layer including a high resistive plated layer and a low resistive plated layer each having different conductivity.

19. The battery pack according to claim 18, wherein the metal plated layer is formed by depositing the high resistive plated layer on a surface of the low resistive plated layer.

20. The battery pack according to claim 18, wherein the high resistive plated layer is one of nickel and nickel alloy, or one of chromium and chromium alloy, and the low resistive plated layer is one of copper and copper alloy, or one of silver and silver alloy.

21. The battery pack according to claim 20, wherein the high resistive plated layer is nickel and the low resistive plated layer is copper.

22. The battery pack according to claim 18, wherein opposite surfaces of the connector are connected, through welding, respectively to battery end faces of the batteries placed at opposing positions.

* * * * *